United States Patent [19]
Muto et al.

[11] 4,437,051
[45] Mar. 13, 1984

[54] METHOD AND APPARATUS FOR CONTROLLING INDUCTION MOTOR

[75] Inventors: Nobuyoshi Muto; Hiroshi Nagase; Keijiro Sakai; Yasuo Matsuda, all of Hitachi, Japan

[73] Assignee: Hitachi, Ltd., Tokyo, Japan

[21] Appl. No.: 441,624

[22] Filed: Nov. 15, 1982

[30] Foreign Application Priority Data

Nov. 16, 1981 [JP] Japan .................... 56-182304

[51] Int. Cl.³ .............................................. H02P 5/40
[52] U.S. Cl. ..................................... 318/808; 318/811
[58] Field of Search ...................... 318/803, 807–812

[56] References Cited
U.S. PATENT DOCUMENTS 4,310,791 1/1982 Akamatsu ...................... 318/808

Primary Examiner—David Smith, Jr.
Attorney, Agent, or Firm—Antonelli, Terry & Wands

[57] ABSTRACT

Disclosed is a method and apparatus for operating an induction motor by an inverter of the pulse-width modulation (PWM) type, wherein the slip frequency is calculated from the speed command and the actual motor speed so as to produce the phase compensation signal, and the frequency command for the inverter is produced by adding the phase compensation signal, the slip frequency signal and the motor speed signal. The primary current command is calculated from the slip frequency, the amplitude ratio of pulse-width modulation is calculated basing on the primary current command and the actual primary current, and the inverter is controlled in accordance with the amplitude ratio so as to control the primary current of the induction motor.

4 Claims, 4 Drawing Figures

METHOD AND APPARATUS FOR CONTROLLING INDUCTION MOTOR

The present invention relates to a method and apparatus for controlling an induction motor to run at a variable speed.

In operating an induction motor through a power converter such as an inverter, it is known that a satisfactory torque performance is obtained constantly in consideration of the magnetic saturation in the induction motor by controlling the slip frequency as a function of the primary current of the motor. This method, however, does not provide a high response control of the induction motor and has a problem of causing a transient oscillation in the torque. In order to improve the transient torque characteristics, there is proposed a vector control method of the frequency control type as disclosed in Japanese Patent Application Laid-Open No. 149314/77. This method features as follows.

First, the torque command is multiplied by the secondary current conversion gain $K_1$ to obtain the secondary current value $I_2$, which causes a function generator to provide a primary current value $i_1$ in accordance with the function, $i_1 = \sqrt{I_2^2 + i_0^2}$ (where $i_0$ is a constant related to the motor excitation current). The secondary current value $I_2$ is used to obtain the slip frequency $\omega_S$, which is the sum of the steady-state slip frequency $\omega_{S1}$ and a slip frequency $\omega_{S2}$ for a transient torque variation caused by the secondary current $I_2$, i.e., $\omega_S = \omega_{S1} + \omega_{S2}$. These slip frequencies are obtained as, $$\omega_{S1} = K_1 \frac{I_2}{i_0} \text{ and } \omega_{S2} = K_2 \frac{d}{dt} \tan^{-1}\left(\frac{I_2}{i_0}\right)$$

where $K_2$ is a gain constant. The slip frequency value $\omega_S$ is added by a value representing the motor speed $\omega_M$ so as to provide a command frequency $\omega_1$ to the inverter. The frequency of the primary current is controlled in accordance with the command frequency $\omega_1$, so that the primary current is controlled by the primary current value $i_1$.

This control achieves high response operation of the induction motor. However, when this method is applied to the induction motor control having a pulse width modulation (PWM) inverter of the voltage type as a power converting means, various problems arise.

In this method, when obtaining the slip frequency $\omega_{S2}$ to be compensated, its phase $\tan^{-1}(I_2/i_0)$ becomes the phase of the primary current. If this relation is directly applied to the PWM inverter, the phase compensation is not performed properly in a transient period, causing a transient oscillation in the motor torque to occur. This does not provide the improvement in the transient torque characteristics, and a high response operation of the induction motor cannot be expected.

In addition, when the foregoing prior art method is intended to be carried out using a digital computer, the computational process is too complicated for a microcomputer with a relatively low processing speed, making it difficult to realize a microcomputer based system. It is an object of the present invention to provide a method and apparatus for controlling an induction motor suitable for a system of operating the induction motor using a voltage-based PWM inverter.

Another object of the present invention is to provide a method and apparatus for realizing a high response control for an induction motor.

Still another object of the present invention is to provide a simple method and apparatus for controlling an induction motor.

According to one aspect of the present invention, in operating an induction motor which is powered by a pulse width modulation (PWM) inverter, the difference between the command speed ($\omega_{REF}$) and the actual motor speed ($\omega_M$) is calculated, and the slip frequency value ($\omega_S$) is obtained from the difference. The slip frequency value is multiplied by the motor constant $K_1$ and transformed by the arctangential function, i.e., $\tan^{-1} \omega_S \cdot K_1$, so that the phase ($\theta_1$) of the primary current is obtained. The current phase value is multiplied by the gain constant ($K_2$) so that it is transforded into the phase ($\theta_V$) of the primary voltage. The primary voltage phase value is differentiated to obtain the phase compensation value ($\omega_S'$), which is added by the above-mentioned slip frequency value ($\omega_S$) and the motor speed value ($\omega_M$) so as to obtain the frequency command ($\omega_1$) for the inverter. The primary current command ($I_{REF}$) is calculated from the slip frequency value ($\omega_S$), and the difference between the command value and the rectified primary current value ($I_L$) is integrated so as to obtain the amplitude ratio ($K_H$) of the inverter. Then, pulse width modulation of the inverter is carried out using the amplitude ratio and the frequency command.

The present invention will now be described with reference to the accompanying drawings, in which.

Figure 1:
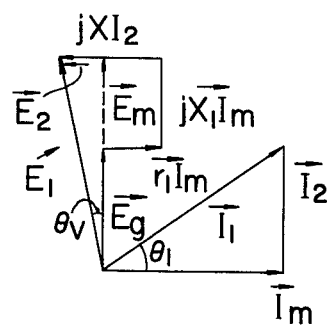
FIG. 1 is a vectorial diagram useful to explain the principle of the present invention.

Before entering into the detailed description of the embodiment shown in FIG. 3, fundamentals of the invention will be explained in connection with FIGS. 1 and 2.

First, the phase of the primary current of the induction motor is measured and it is converted into the phase of the primary voltage. The following will describe the principle of conversion based on the d-q bi-axis theory.

According to the d-q bi-axis theory, the voltage-current equations for a 2-phase induction motor are given as follows.

$$\begin{bmatrix} V_{ds} \\ V_{qs} \\ 0 \\ 0 \end{bmatrix} = \begin{bmatrix} r_1 + pl'_1 & -\omega_1 l'_1 & -plm & \omega_1 lm \\ \omega_1 l'_1 & r_1 + pl'_1 & -\omega_1 lm & -plm \\ -plm & \omega_S lm & r_2 + pl'_2 & -\omega_S l'_2 \\ \omega_S lm & -plm & \omega_S l'_2 & r_2 + pl_2 \end{bmatrix} \cdot \begin{bmatrix} ids \\ iqs \\ idr \\ iqr \end{bmatrix} \quad (1)$$

where $p$ signifies $d/dt$, $l'_1 = l_1 + l_m$ and $l'_2 = l_2 + l_m$. At the same time, the motor torque is given as follows.

$$T = Pl_m(ids \cdot iqr - iqs \cdot idr) \quad (2)$$

where,
p: Number of pole pairs
Vds: Stator d-axis voltage
Vqs: Stator q-axis voltage ids: Stator d-axis current
iqs: Stator q-axis current
idr: Rotor d-axis current
iqr: Rotor q-axis current
r₁: Primary winding resistance
r₂: Secondary winding resistance
l₁: Primary leakage inductance
l₂: Secondary leakage inductance
$l_m$: Excitation winding inductance
ω₁: Inverter frequency Setting the d-axis to coincide with the magnetic flux axis gives $$ids = I_m \text{ and } iqs = I_2 \quad (3)$$

Here, the condition that the magnetic flux $I_m$ is constant ($dI_m/dt=0$) and the control condition for the slip frequency $\omega_S$:

$$\omega_S = r_2 \cdot I_2 / l'_2 \cdot I_m \quad (4)$$

are introduced as a well known condition of vector control.

Substituting equations (3) and (4) into equation (1) gives $$iqr = I_2 l_m / l'_2 \text{ and } idr = 0 \quad (5)$$

The stator voltages Vds and Vqs are $$Vds = r_1 \cdot I_m - \omega_1 l'_1 (1 - l^2_m/l'_1 l'_2) I_2 \quad (6)$$

$$Vqs = \omega_1 l'_1 I_m + r_1 I_2 + \frac{d}{dt}(l'_1 a I_2) \quad (7)$$

$$a = 1 - l^2_m / l'_1 \cdot l'_2 \quad (8)$$

Since the value of the leakage factor a is very small, the transient term of equation (7) can be ignored and the voltage can be estimated solely by the constant steady state term, whereby a high response control is made possible.

In this case, the motor torque of equation (2) is reduced to as $$T = P \cdot (l^2_m / l_2) \cdot I_m \cdot I_2 \quad (9)$$

This shows that the motor torque is proportional to $I_2$ provided that $I_m$ is constant. Thus, the transfer function of the torque against the secondary current is made constant.

Next, phases $\theta_V$ and $\theta_I$ of the primary voltage $\vec{E}_1$ and primary current $\vec{I}_1$ produced by the secondary voltage $\vec{E}_2$ and excitation voltage $\vec{E}_m$, and the secondary current $\vec{I}_2$ and excitation current $\vec{I}_m$, respectively, will be considered. Ignoring the transient term of equation (7), there are relations of $E_m$ and $-E_2$ for the magnitude of $\vec{E}_m$ and $\vec{E}_2$, Vqs and Vds due to the direction of the d and q axes, the vectorial relations expressed by equations (6) and (7) becomes as follows.

$$\vec{E_2} = -r_1 \vec{I_m} + j\omega_1 a l'_1 \vec{I_2} \quad (10)$$

$$\vec{E_m} = j\omega_1 l_1 \vec{I_m} + r_1 \vec{I_2} + \vec{E_g} \quad (11)$$

$$\vec{E_g} = j\omega_1 l_m \vec{I_m} \quad (12)$$

where $\vec{E_g}$ is the gap voltage.

FIG. 1 depicts in vectorial diagram the equations (10), (11) and (12) on conditions: $X = \omega_1 a l_1$, $X_1 = \omega_1 l_1$ and $X_m = \omega_1 l_m$.

In FIG. 1, the current phase $\theta_I$ and voltage phase $\theta_V$ are given $$\theta_I = \tan^{-1} (I_2/I_m) \quad (13)$$

$$\theta_V = \tan^{-1}\left( \frac{-I_m r_1 + I_2 X}{I_m(X_1 + X_m) + I_2 r_1} \right) \quad (14)$$

The gain $\theta_V/\theta_I$ has a value of around 0.1 for a 2.2 kW induction motor.

Figure 2:
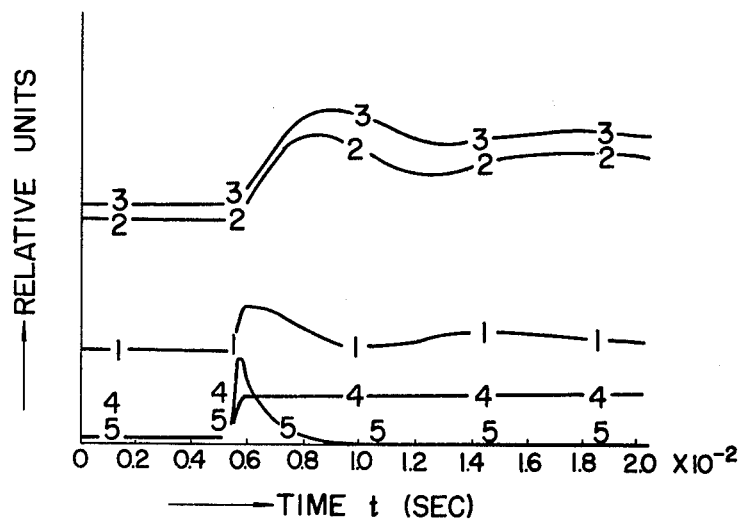
FIG. 2 is a waveform chart showing the step response of the motor torque, the primary current and the amplitude ratio.
Figure 3:
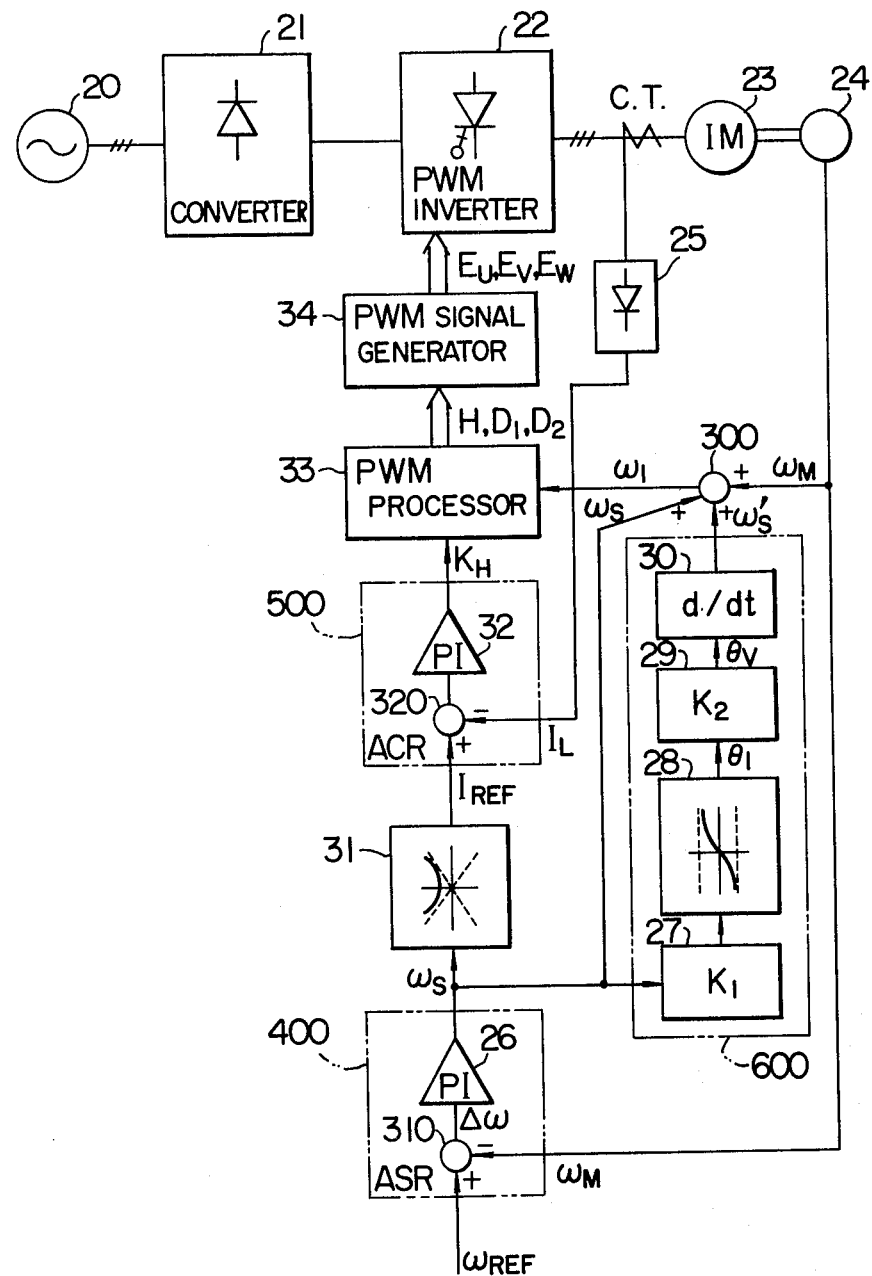
FIG. 3 is a block diagram showing an embodiment of the present invention.

FIG. 2 shows the result of simulation for the step response of the vector control system including the induction motor and PWM inverter, where curve 1 indicates the amplitude ratio $K_H$, curve 2 indicates the motor torque, curve 3 indicated the primary current, and curve 4 indicates the slip frequency $\omega_S$. The simulation result for the dynamic characteristics was obtained by solving equation (1) for a 2.2 kW 6-pole induction motor. The gain of phase compensation, i.e., $\theta_V/\theta_2$, was set to 0.1, and its compensating response is shown by curve 5. It can be seen from the chart that the setup time of the primary current, amplitude ratio (voltage command to the PWM inverter) and torque is much reduced (1.5 ms approximately) relative to the motor time constant (110 ms in this example).

Various simulation results show that control performances similar to the above example can be obtained with the phase compensation gain ranging from 0.07 to 0.2, however, the direct use of the current phase as the voltage phase deteriorates the setup characteristics of the motor torque.

The following will describe the arrangement of the overall vector control system including the above-mentioned phase compensation system.

The value of the primary current $I_1$ and its phase $\theta_I$ can be expressed using the above-mentioned $I_m$ and $I_2$ as follows.

$$I_1 = \sqrt{I_m^2 + I_2^2} \quad (15)$$

$$\theta_I = \tan^{-1}(I_2/I_m) \quad (16)$$

Using the control condition in equation (4), the equations (15) and (16) can be expressed as functions of the slip frequency $\omega_S$ as follows.

$$I_1 = I_m \sqrt{1 + K_1^2 \omega_S^2} \quad (17)$$

$$\theta_I = \tan^{-1}(K_1 \omega_S) \quad (18)$$

where $$K_1 = \frac{l_2 + l_m}{r_2}.$$

In addition, the following relations are introduced as gains for converting from the current-based values to the voltage-based values.

Phase converting gain: $K_2 = \theta_V / \theta_I$ \quad (19)

Amplitude converting gain: $K_H = K_3(I_{REF} - I_L)$ (20)

Thus, all operating parameters in ASR system for evaluating $\omega_S$ and ACR system for evaluating $K_H$ can be handled as DC values, that considerably simplifies the computational process when performed by a microcomputer.

One embodiment of the present invention will now be described with reference to FIG. 3. In the figure, the arrangement includes a 3-phase AC power source 20, an inverter 21 for converting the AC power into the DC power, and a PWM inverter 22 for converting the DC power into another AC power. The inverter 22 is controlled to provide a variable voltage and variable frequency in accordance with the PWM signal. These sections 20, 21 and 22 in combination constitute a power converter of the PWM type. The pulse-width modulated AC power is applied to an induction motor 23, which runs at a variable speed by receiving the output of the PWM inverter 22. Reference number 24 denotes a speed detector for measuring the rotational speed (angular velocity) $\omega_M$ of the motor 23. In this example, a rotary encoder is employed for the motor speed detector. CT denotes a current transformer which constitutes in conjunction with a converter 25 a motor primary current detector for detecting and transducing the primary current of the motor into a DC voltage. 400 is an automatic speed regulator (ASR) which receives the speed command $\omega_{REF}$ and actual speed value $\omega_M$, and provides the control signal $\omega_S$ so that the difference between the command and actuatl speeds is nullified. The control signal $\omega_S$ represents the slip frequency for the induction motor 23. The ASR 400 consists of a subtractor 310 and a proportional and integrating amplifier (will be termed simply PI operational amplifier) which performs a proportional and integrating operations on the output of the subtracter 310. 31 is a function generator which transforms the output $\omega_S$ of the ASR into the motor current command signal $I_{REF}$. 500 is an automatic current regurator (ACR) which receives the current command $I_{REF}$ and the detected curent value $I_L$ to provide a control signal $K_H$ so that the difference of these current values is nullified. The signal $K_H$ represents the amplitude ratio for the pulse width modulation control. 600 is an arithmetic unit which receives the slip frequency value $\omega_S$ to provide a phase compensation signal $\omega_S'$. The unit 600 consists of a section (gain multiplier 27 and arctangential function generator 28) which calculates the current phase $\theta_I$ and a section (gain multiplier $K_2$ and differentiator 30) which converts the current phase $\theta_I$ into the voltage phase $\theta_V$ and calculated the phase compensation signal $\omega_S'$. 300 is an adder which adds the slip frequency value $\omega_S$, the detector motor speed value $\omega_M$ and the phase compensation signal $\omega_S'$ calculated by the unit 600, and provides the inverter frequency command $\omega_1$ which determines the output frequency of the inverter 22. 33 is a pulse-width modulation processor which processes the input amplitude ratio $K_H$ and inverter frequency command $\omega_1$ so as to determine the waveform of the carrier and modulation wave. 34 is a PWM signal generator which forms the PWM signals (gate signals) in accordance with the output of the PWM processor 33, and supplies the signals to the PWM inverter 22. The arrangement of FIG. 3 can partly be replaced with a microcomputer. Specifically, except for the principal circuit devices 20, 21, 22, 23 and 24, and the PWM signal generator 34, all or part of the remaining portions performing arithmetic processes can be replaced with a microcomputer.

The operation of the arrangement shown in FIG. 3 will be described in the following. The system operates so that the actual motor speed $\omega_M$ coincides with the speed command $\omega_{REF}$. The ASR 400 performs PI compensation for the difference $\Delta\omega$ between $\omega_{REF}$ and $\omega_M$, and provides the slip frequency $\omega_S$. In response to the slip frequency $\omega_S$, the function generator 31 produces the primary current command $I_{REF}$ according to the function $I_{REF} = \sqrt{1 + K^2_1 \omega^2_S}$. The slip frequency $\omega_S$ is also supplied to the arithmetic unit 600 and adder 300. The multiplier 27 in the arithmetic unit 600 multiplies the $\omega_S$ by the gain $K_1$ ($K_1 = l_2 + l_m/r_2$) so as to obtain the ratio $K_1 \cdot \omega_S$ of the secondary current to the excitation current. The value of the ratio is given to the arctangential function generator 28, which calculates the value $\theta_I = \tan^{-1}(K_1 \omega_S)$ according to equation (18). The current phase value $\theta_I$ is given to the gain multiplier 29, which calculates the voltage phase $\theta_V$ according to equation (19). The voltage phase value $\theta_V$ is given to the differentiator 30, which provides the phase compensation vvalue $\omega_S'$. The adder 300 adds the slip frequency value $\omega_S$, the motor speed value $\omega_M$ and the phase compensation signal $\omega_S'$ to provide the inverter frequency command $\omega_1$. The ACR 500 calculates the PWM amplitude ratio $K_H$ from the current command $I_{REF}$ and the detected current value $I_L$ according to equation (20). The output $K_H$ of the ACR 500 and the output $\omega_1$ of the adder 300 are supplied to the PWM processor 33, which determines the waveform of the carrier and modulation wave in accordance with the values of $K_H$ and $\omega_1$.

The processing by the PWM processor will be described in connection with FIG. 4 which shows the modulation with the partition number of N=15. The partition number N indicates the number of carrier waves during a half cycle of the modulated staircase wave. Comparison of the solid state section of the modulated staircase wave with the triangular wave gives the U-phase PWM signal $E_U$, comparison of the dashed line section of the staircase wave with the triangular wave gives the V-phase PWM signal $E_V$, and comparison of the dot-dashed line section of the staircase wave with the triangular wave gives the W-phase PWM signal $E_W$. The PWM processor 33 performs the following processes.

First, the processor 33 calculates the peak value H of the triangular wave form the inverter frequency command $\omega_1$ ($\omega_1 = 2\pi f_1$), the partition number N, and the basic timing T ($\mu s$) of the triangular wave according to the following equation.

$$H = \frac{10^6}{2N \cdot T \cdot f_1}$$

where $f_1 = \omega_1/2\pi$

The modulation level $D_2$ is calculated from the peak value H and the amplitude ratio $K_H$ according to $D_2 = K_H \cdot H$, then the modulation level $D_1$ is calculated from $D_2$ according to $D_1 = \alpha D_2$, where $\alpha$ is a proportional factor determined in consideration of harmonics in the PWM signa and in this example $\alpha = 0.25$. Thus the PWM processor serves to calculate the peak value H of the carrier wave and the modulation levels $D_1$ and $D_2$ of the modulation wave (staircase wave).

Figure 4:
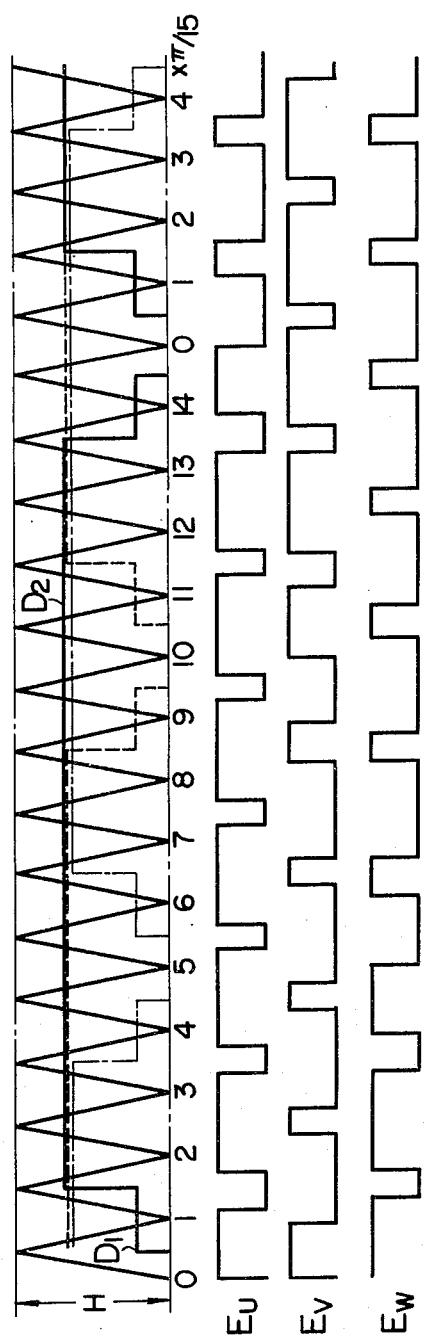
FIG. 4 is a timing chart explaining the operation of the pulse width modulation.

The PWM signal generator 34 receives the values H, D$_1$ and D$_2$, and produces the PWM signals (E$_U$, E$_V$ and E$_W$) as shown in FIG. 4. The PWM inverter 22 has the gates controlled by these PWM signals so as to provide the AC power with a controlled voltage and frequency for the induction motor 23. Then the induction motor 23 is energized and controlled to a speed of $\omega_{REF}=\omega_M$ steadily.

By the foregoing arrangement of the motor speed control system, a high response speed control is achieved and a transient oscillation in the motor torque is prevented. Moreover, all detected signals are converted into DC signals before entering the signals into the control system so that the entire computational process is performed on a DC basis, resulting in a considerably simplified arithmetic operations. The inventive control method is particularly suitable for realizing a control system which is partly or entirely replaced with a microcomputer.

It should be noted that the foregoing embodiment is arranged to calculate the primary current and its phase as functions of the slip frequency $\omega_S$ using equations (17) and (18), however, arrangement may be made so that these values are calculated as functions of the secondary current I$_2$ using equations (15) and (16).

According to the present invention, the phase compensation which matches the voltage-based PWM inverter can be performed, whereby high response torque characteristics can be obtained. This feature allows the inventive method and apparatus to be applied effectively to extensive industrial fields including AC motor spindle drive systems for machine tools.

We claim:

1. An induction motor control system comprising an inverter for producing AC power by pulse-width modulation, an induction motor powered by said inverter, a speed detector for measuring the rotational speed of said induction motor, a current detector for measuring the primary current of said induction motor, a speed controller which receives a speed command and output of said speed detector so as to provide a speed control signal, a current controller which receives said speed control signal and output of said current detector so as to provide a current control signal, an adder which adds output of said speed detector and said speed control signal so as to provide an inverter frequency command, and a pulse-width modulator which produces a pulse-width modulation signal in accordance with outputs of said current controller and said adder and supplies said pulse-width modulation signal to said inverter, wherein said system further comprises a computational means which receives said speed control signal and calculates the value of phase compensation, output of said means being supplied to said adder so that it is added to output of said speed detector and said speed control signal, output of said adder being supplied as said inverter frequency command to said pulse-width modulator.

2. A control system according to claim 1, wherein said phase compensation value computational means comprises a first computational section which receives said speed control signal and calculates the phase of current and a second computational section which receives said current phase, converts it into the phase of voltage, then calculates a phase compensation signal.

3. A method of controlling an induction motor powered by an inverter which produces AC power by pulse-width modulation, comprising the steps of calculating a difference between a speed command and an actual motor speed, calculating a slip frequency basing on said difference, calculating a phase compensation value basing on said slip frequency, providing a frequency command to said inverter by adding said phase compensation value, said slip frequency value and said motor speed value, calculating a primary current command from said slip frequency value, calculating an amplitude ratio for said inverter basing on a difference between said primary current command and a detected primary current value, and performing pulse-width modulation for said inverter in accordance with said amplitude ratio and said frequency command.

4. A control method according to claim 3, wherein said phase compensation value is obtained through the steps of multiplying said slip frequency value by a motor dependent current, calculating the arctangential function for the result of said multiplication so as to obtain the phase of the primary current, multiplying said primary current phase value by a conversion gain so that said primary current phase is converted into a primary voltage phase, and differentiating said primary voltage phase value to obtain said phase compensation value.

* * * * *